United States Patent
Hioki

(10) Patent No.: US 11,388,009 B2
(45) Date of Patent: Jul. 12, 2022

(54) TOKEN MANAGEMENT SYSTEM AND TOKEN MANAGEMENT METHOD

(71) Applicant: Leona Hioki, Tokyo (JP)

(72) Inventor: Leona Hioki, Tokyo (JP)

( * ) Notice: Subject to any disclaimer, the term of this patent is extended or adjusted under 35 U.S.C. 154(b) by 370 days.

(21) Appl. No.: 16/727,664

(22) Filed: Dec. 26, 2019

(65) Prior Publication Data

US 2020/0213121 A1 Jul. 2, 2020

(30) Foreign Application Priority Data

Dec. 28, 2018 (JP) .............................. JP2018-246419

(51) Int. Cl.
| | |
|---|---|
| *H04L 9/32* | (2006.01) |
| *G06F 16/23* | (2019.01) |
| *H04L 9/30* | (2006.01) |
| *H04L 9/06* | (2006.01) |
| *G06Q 20/38* | (2012.01) |

(52) U.S. Cl.
CPC ........ *H04L 9/3234* (2013.01); *G06F 16/2365* (2019.01); *G06Q 20/389* (2013.01); *G06Q 20/3829* (2013.01); *H04L 9/0637* (2013.01); *H04L 9/30* (2013.01); *H04L 9/3247* (2013.01); *G06Q 2220/18* (2013.01); *H04L 2209/38* (2013.01)

(58) Field of Classification Search
CPC ....... H04L 9/3234; H04L 9/30; H04L 9/0637; H04L 9/3247; G06F 16/2365; G06Q 20/359; G06Q 20/3829; G06Q 2220/18; G06Q 2220/38
USPC ........................................................ 713/159
See application file for complete search history.

(56) References Cited

U.S. PATENT DOCUMENTS

| | | | | |
|---|---|---|---|---|
| 10,579,779 | B2 * | 3/2020 | Wright | ............... H04L 63/0823 |
| 10,956,931 | B2 * | 3/2021 | Hain | .................. G06Q 30/0248 |
| 2019/0163883 | A1 * | 5/2019 | Savanah | ................. G06F 21/12 |
| 2019/0229926 | A1 * | 7/2019 | Handa | .................. G06Q 20/223 |
| 2019/0303543 | A1 * | 10/2019 | Savanah | .................. G06F 8/65 |
| 2020/0005284 | A1 * | 1/2020 | Vijayan | ................. G06Q 20/36 |
| 2020/0117690 | A1 * | 4/2020 | Tran | .................. G06F 16/90332 |
| 2020/0202344 | A1 * | 6/2020 | Bougalis | ............... H04L 9/3239 |
| 2020/0257775 | A1 * | 8/2020 | Wright | .................. G06F 21/105 |

(Continued)

FOREIGN PATENT DOCUMENTS

| | | |
|---|---|---|
| JP | 6402965 B2 | 10/2018 |
| WO | 2017/195164 A | 11/2017 |

OTHER PUBLICATIONS

Blockchain Research Institute, "What is ERC721?", https://medium.com/blockchain-research-institute/erc721%E3%81%A8%E3%81%AF-38e80ea2b328, Dec. 20, 2017.

(Continued)

*Primary Examiner* — Samson B Lemma
(74) *Attorney, Agent, or Firm* — Calfee, Halter & Griswold LLP

(57) ABSTRACT

A token management system includes a generation unit that generates a non-fungible token associated with a product identifier in a distributed ledger, a management unit that associates the non-fungible token with a first public key, and a second public key for licensing processing in the distributed ledge, and a transfer unit that performs transaction processing of changing the first public key associated with the non-fungible token on the basis of a first private key is realized.

6 Claims, 3 Drawing Sheets

(56) References Cited

U.S. PATENT DOCUMENTS

| | | | |
|---|---|---|---|
| 2021/0256070 A1* | 8/2021 | Tran | G06F 16/90332 |
| 2021/0281410 A1* | 9/2021 | Hain | G06Q 20/065 |
| 2021/0326857 A1* | 10/2021 | Yantis | G06Q 20/065 |

OTHER PUBLICATIONS

Morota, What is "Non-Fungible Token(NFT)" often heard in discussion of Cryptocurrency? Easy-to-understand explanations of features and usage, https://coinchoice.net/what-is-non-fungible-token-nft/, Jul. 23, 2018.

* cited by examiner

TOKEN MANAGEMENT SYSTEM AND TOKEN MANAGEMENT METHOD

CROSS-REFERENCE TO RELATED APPLICATIONS

This application claims priority to Japanese Patent Application No. 2018-246419, filed Dec. 28, 2018, the entire content of which is incorporated herein by reference.

BACKGROUND

Technical Field

An embodiment of the present invention relates to a token management system and a token management method.

Related Art

Distribution of intangible assets such as digital distribution of a computer product is performed at least on the basis of a process of distributing either of a serial number and an application programming interface (API) key, and a payment process based on a credit card or the like. Here, the distribution has problems that it is difficult to purchase intangible assets based on a reasonable price and that it is difficult to share intangible assets.

According to Japanese Patent No. 6402965, a license management server including an owner storage unit that stores an owner management database to manage an owner of each business application, a borrower storage unit that stores a borrower management database to manage a borrower of each business application, and a token management unit that issues a license for each business application to a borrower of the business application on the basis of the borrower management database and that transmits management information related to license management of the business application to the owner of the business application on the basis of the owner management database has been reported.

SUMMARY

However, in a case where a central management server group integrally manages distribution of intangible assets, a selling price of the intangible assets may not be evaluated with an appropriate price by a market. Also, there is a danger that confidential information including credit card information necessary for a payment process related to the distribution is leaked/lost, and it is difficult to say that license management to suitably perform distribution of intangible assets can be realized.

The present invention is provided in view of the above actual circumstances and is to realize token management that is to perform license management, that secures liquidity, that has a liberalized distribution price, and that is in a viewpoint of privacy protection of a purchaser and a seller.

In view of the above problems, an embodiment of the present invention is a token management system including a generation unit that generates a non-fungible token associated with a product identifier in a distributed ledger based on a computer device including an administrator terminal, a licensor terminal, and a licensee terminal, a management unit that associates the non-fungible token with a first public key, and a second public key for licensing processing in the distributed ledger, and a transfer unit that performs, on the basis of a first private key, transaction processing of changing the first public key associated with the non-fungible token in the distributed ledger.

With such a configuration, an embodiment of the present invention can realize distributed processing of ownership management and licensing processing of intangible assets on the basis of a non-fungible token, and can promote liberalization of a distribution price related to the intangible assets.

Also, with such a configuration, ownership of intangible assets corresponds to a non-fungible token on a distributed network including a plurality of computer devices. Thus, an embodiment of the present invention further has a technological effect that a fault tolerance in a system is improved.

In a preferred embodiment of the present invention, a distributed ledger is a blockchain based on one or more nodes and a proof-of-work and/or proof-of-stake consensus algorithm, and includes a virtual machine having a storage area.

With such a configuration, an embodiment of the present invention can realize transparency securing and user privacy protection related to ownership management and licensing processing of intangible assets.

Also, with such a configuration, an embodiment of the present invention further has a technological effect that tamper resistance of a Turing complete and decentralized crypto network can be imparted to the system.

In a preferred embodiment of the present invention, the management unit registers a second public key as metadata of a non-fungible token on the basis of a data description language representing at least one of a numerical value, a character string, a truth value, an array, and an object by a distributed ledger based on one or more computer devices.

With such a configuration, an embodiment of the present invention can realize suitable token management on the basis of an object-type data description language, readability of which is secured, in a JSON format, for example.

Also, with such a configuration, an embodiment of the present invention can manage metadata related to a non-fungible token in a small data size compared to a case where a markup language is used, and further has a technological effect that a load on a database including a distributed ledger can be reduced.

In a preferred embodiment of the present invention, the transfer unit associates a non-fungible token and a first public key of a transfer destination with transaction processing as a turning point, and the management unit associates the non-fungible token and a second public key of the transfer destination.

With such a configuration, an embodiment of the present invention can easily perform privacy protection related to an ownership transfer of intangible assets on the basis of a non-fungible token that is a setting destination of the ownership.

Also, with such a configuration, an ownership transfer of intangible assets are managed on a distributed network including one or more computer devices. Thus, an embodiment of the present invention further has a technological effect that a system load due to storage or update of information related to ownership of intangible assets can be reduced.

In a preferred embodiment of the present invention, the management unit cancels the association between the non-fungible token, which corresponds to the second public key, and the product identifier with transaction processing based on the second private key as a turning point.

With such a configuration, an embodiment of the present invention can inhibit skipping out on intangible assets bill by a large number of users other than the user which occurs when a user of a licensee terminal associated with a non-fungible token, discloses a second public key corresponding to the non-fungible token.

Also, with such a configuration, there is a further technological effect that a use of intangible assets corresponding to a product identifier by the large number of users can be inhibited and a load on a distributed database can be reduced.

In a preferred embodiment of the present invention, a token management system includes a permission unit that performs verification processing of a digital signature, which is generated on the basis of the second private key, with an administrator terminal on the basis of a second public key and that performs licensing processing corresponds to a product identifier on the basis of a result of the verification processing.

With such a configuration, an embodiment of the present invention can realize licensing processing related to intangible assets corresponding to a product identifier on the basis of complementary processing by a licensor terminal and a distributed database.

Also, with such a configuration, an embodiment of the present invention can cause the distributed database to execute management of a second public key related to the licensing processing, and has a technological effect that a load on a database included in the licensor terminal can be reduced.

In a preferred embodiment of the present invention, the permission unit performs input processing of a token identifier with respect to a distributed ledger with reception processing of a token identifier and a digital signature that are associated with a non-fungible token by an administrator terminal being a turning point, the management unit performs output processing of a second public key associated with the non-fungible token with the input processing being a turning point, and the permission unit executes verification processing of the digital signature on the basis of the second public key with the output processing being a turning point and executes licensing processing in a case where the verification processing is successful.

With such a configuration, an embodiment of the present invention can realize distributed processing of ownership management and licensing processing of intangible assets on the basis of a non-fungible token, and can promote liberalization of a distribution price related to the intangible assets.

Also, with such a configuration, ownership of intangible assets corresponds to a non-fungible token on a distributed network including a plurality of computer devices. Thus, an embodiment of the present invention further has a technological effect that a fault tolerance in a system is improved.

An embodiment of the present invention is a token management method causing a processor of a computer to execute a generating step of generating a non-fungible token associated with a product identifier in a distributed ledger, a managing step of associating the non-fungible token with a first public key, and a second public key for licensing processing in the distributed ledger, and a transfer step of performing transaction processing of changing the first public key associated with the non-fungible token on the basis of a first private key in the distributed ledger.

An embodiment of the present invention is a token management program causing a computer to function as a generation unit that generates a non-fungible token associated with a product identifier in a distributed ledger, a management unit that associates the non-fungible token with a first public key, and a second public key for licensing processing in the distributed ledge, and a transfer unit that performs, on the basis of a first private key, transaction processing of changing the first public key associated with the non-fungible token.

According to an embodiment of the present invention, suitable token management can be realized on the basis of a distributed database having tamper resistance and transparency.

DETAILED DESCRIPTION

In the following, a token management system 1 according to an embodiment of the present invention will be described with reference to the drawings. Note that an embodiment described in the following is an example of the present invention, and the present invention is not limited to the following embodiment, and various configurations can be employed.

In the present embodiment, a configuration, operation, and function of the token management system 1 will be described. Note that a method, a program, or a recording medium having a similar configuration has a similar effect.

A token management program 1001 in the present embodiment is preferably recorded in a non-transitory recording medium. When the recording medium is used, a function related to the token management system 1 can be introduced into a computer device.

The function related to the token management system 1 is realized by utilization of an application stored in a computer device and a hardware resource included in the computer device. The application is realized in a form of installed software or cloud software.

Figure 1:
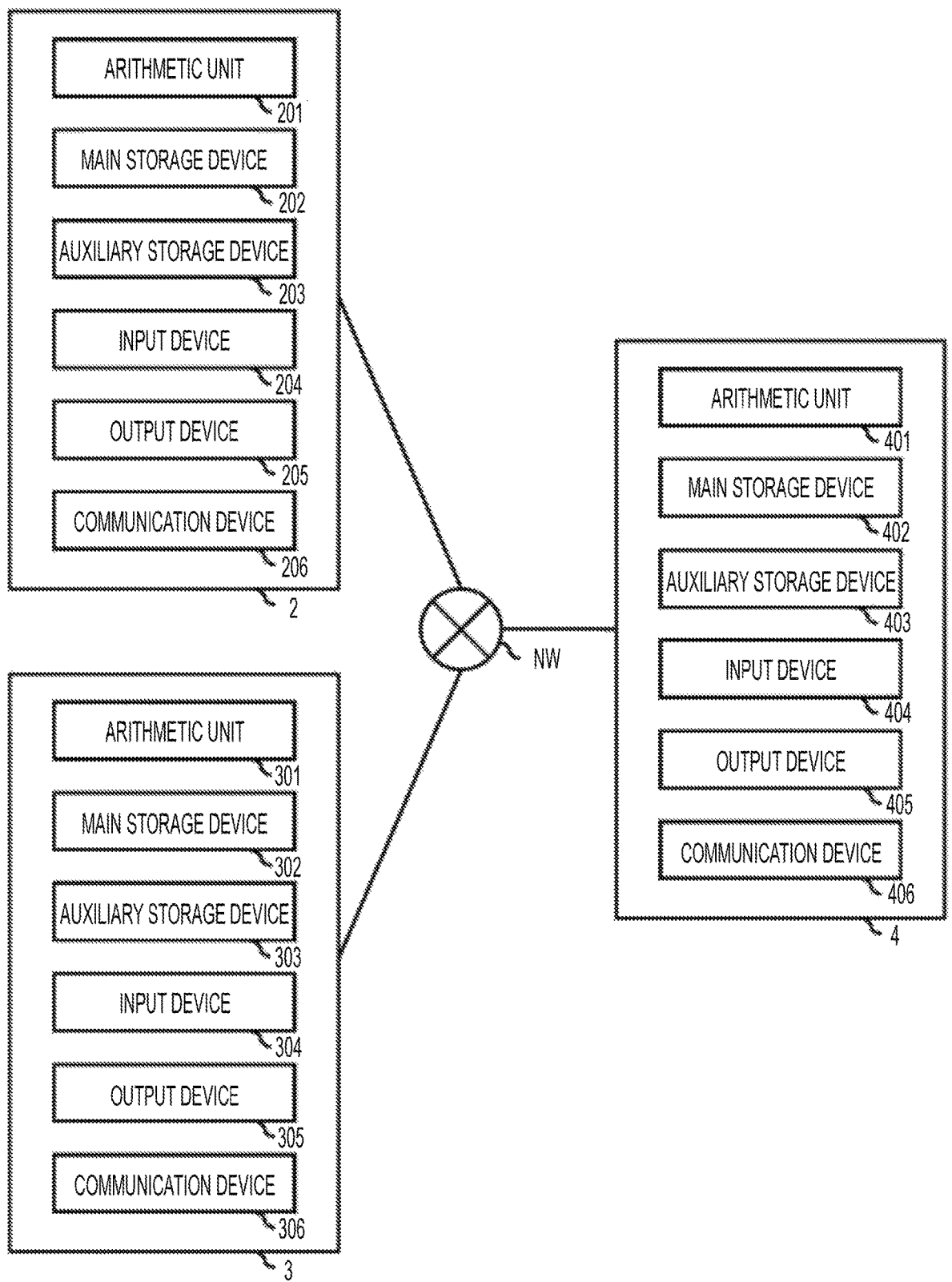
FIG. 1 is a hardware configuration diagram according to an embodiment of the present invention.

As illustrated in FIG. 1, the token management system 1 includes one or a plurality of administrator terminals 2, one or a plurality of licensor terminals 3, and one or a plurality of licensee terminals 4.

The administrator terminal 2 includes an arithmetic unit 201, a main storage device 202, an auxiliary storage device 203, an input device 204, an output device 205, and a communication device 206. Also, the licensor terminal 3 includes an arithmetic unit 301, a main storage device 302, an auxiliary storage device 303, an input device 304, an output device 305, and a communication device 306. Also, the licensee terminal 4 includes an arithmetic unit 401, a main storage device 402, an auxiliary storage device 403, an input device 404, an output device 405, and a communication device 406.

Each of the arithmetic units 201, 301, and 401 includes a processor that can execute an instruction set. Each of the main storage devices 202, 302, and 402 includes a volatile memory such as a random access memory (RAM).

Each of the auxiliary storage devices 203, 303, and 403 includes a recording medium such as a nonvolatile memory, and a recording method thereof is not limited. The recording medium indicates a hard disk drive (HDD) or a solid state drive (SSD), for example.

The auxiliary storage devices 203, 303, and 403 respectively include operating systems (OS 2001, OS 3001, and OS 4001). Each of the auxiliary storage devices 203, 303, and 403 has a token management program 1001 that performs a function thereof in cooperation with an operating system.

The auxiliary storage device 303 corresponds to a database DB. In the database DB, a product identifier PID and a serial number of digital contents including software corresponding to the product identifier PID are registered in a form of a relational database or key-value store.

Each of the input devices 204, 304, and 404 is, for example, a keyboard device, a pointing device, or a touch panel, and there is no limitation in a kind thereof. Each of the output devices 205, 305, and 405 includes a frame buffer to hold drawing information and a display device such as a liquid crystal panel. Note that the token management system 1 in the present embodiment may not include at least one of the input devices 204, 304, and 404 and at least one of the output devices 205, 305, and 405.

In the present embodiment, at least a system on chip (SoC) including an arithmetic unit and a main storage device may be included in at least one of the administrator terminal 2, the licensor terminal 3, and the licensee terminal 4. Here, the SoC includes a processor/coprocessor including a circuit optimized for a hardware wallet, for example.

The communication devices 206, 306, and 406 are used to perform communication via a wireless wide area network (WAN)/local area network (LAN)/personal area network (PAN). The communication is based on a wireless communication standard such as Wi-Fi (registered trademark). A radio wave, a sound wave, and a light wave can be used as a communication medium. Note that the communication devices 206, 306, and 406 in the present embodiment may use a wired communication standard such as Ethernet (registered trademark).

In a network NW in the token management system 1, transmission control protocol/Internet protocol (TCP/IP) is used as a communication protocol, for example. Note that a community antenna television (CATV) line, a mobile communication network, an aeronautical telecommunication network, and a satellite communication network can be used as the network NW.

Figure 2:
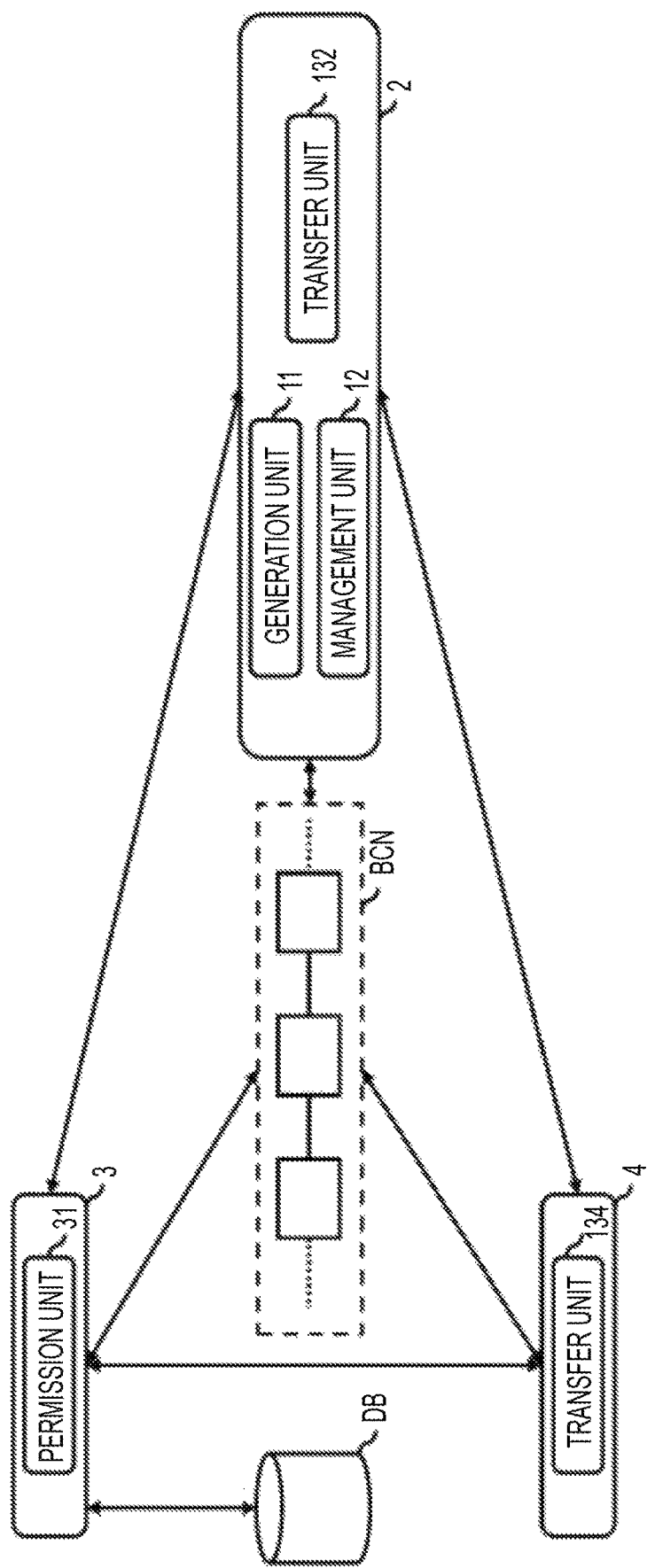
FIG. 2 is a functional block diagram according to the embodiment of the present invention.

As illustrated in FIG. 2, the token management system 1 includes an administrator terminal 2, a licensor terminal 3, and a licensee terminal 4.

The administrator terminal 2 executes a function related to the generation unit 11 and the management unit 12 in cooperation with a blockchain BCN.

The licensor terminal 3 performs a function related to the permission unit 31 in cooperation with the blockchain BCN.

The licensee terminal 4, the licensor terminal 3, or the administrator terminal 2 performs a function related to the transfer unit 13 in cooperation with the blockchain BCN.

In the blockchain BCN, one or more nodes including the administrator terminal 2, the licensor terminal 3, and the licensee terminal 4 may perform network maintenance/update including hashing of an unapproved block on the basis of a proof-of-work (PoW) and/or proof-of-stake (PoS) consensus algorithm. Note that in the distributed ledger in the present embodiment, a specific validator among network participants may approve transaction processing.

In the present embodiment, token management based on Ethereum, an Ethereum virtual machine (EVM), and an Ethereum request for comments-721 (ERC-721) tokens is exemplified. Note that in the present embodiment, a kind of a distributed ledger is not limited as long as a data storage function and a non-fungible token generating function are included.

The generation unit 11 associates a non-fungible token NFT, a token identifier TID, and a product identifier PID with each other in the blockchain BCN that behaves as a state transition machine (state machine). The generation unit 11 executes smart contract on the basis of a virtual machine EVM on the blockchain BCN, and generates a non-fungible token NFT.

In the blockchain BCN, blocks each of which includes a block header and one or more transactions have a correlation in form of a hash chain. The block header includes a hash value of a parent block, a hash value of a root node indicating a state tree corresponding to a state in which all transactions in a current block are executed, a hash value of a root node indicating a transaction tree corresponding to a transaction in the current block, and a hash value of a root node indicating a data structure related to an execution result of the transaction included in the current block. Here, the root nodes included in the block header are associated with an intermediate node and a leaf node at an end, and behave as a Merkle Patricia tree-type data structure.

A state of the blockchain BCN includes an account state and a machine state. Transaction processing to perform a state transition at least includes an address, a value, and input data. The account state includes a contract account CA and an externally owned account (EOA), and the transaction processing on the blockchain BCN designates processing between EOA/CA. The transaction processing is executed on the basis of a first private key. Here, a network cost necessary for execution of the transaction processing is arbitrarily determined.

The virtual machine EVM includes a virtual arithmetic unit EVM 101, a virtual main storage device EVM 102, and a virtual auxiliary storage device EVM 103.

The virtual arithmetic unit EVM 101 includes an arithmetic unit included in at least one node in the blockchain BCN. The virtual main storage device EVM 102 behaves as a volatile storage area and is associated with a machine state. The virtual auxiliary storage device EVM 103 behaves as a non-volatile storage area, and behaves as a storing destination of a contract code EVM 1001 and a storage. The storage stores a second public key related to token management. Note that update of a machine state is performed on the basis of input data (message call) included in the transaction processing.

The generation unit 11 generates a contract account CA having the contract code EVM 1001 on the blockchain BCN via the externally owned account EOA. The generation of a non-fungible token NFT in the present embodiment is executed via an API (Web3API) in a form of transaction processing via the contract account CA.

The generation unit 11 associates a token identifier TID with a non-fungible token NFT, and associates a product identifier PID with the non-fungible token NFT as metadata of the non-fungible token NFT. The product identifier PID is associated with a serial number of digital contents including software, for example. Here, the metadata is described on the basis of a data description language representing at least one of a numerical value, a character string, a truth value, an array, and an object. The data description language is, for example, a JSON format. Note that a first public key corresponding to the contract account is first associated with the generated non-fungible token NFT.

The management unit 12 associates the non-fungible token NFT, the first public key, and the second public key in the blockchain BCN. The management unit 12 registers the second public key as metadata of the non-fungible token NFT. The registered second public key is stored in the virtual auxiliary storage device EVM 103. Note that the first public key and the second public key preferably have different configurations.

The management unit 12 preferably registers the second public key as meta data with transaction processing based on the first private key by any of the licensee terminal 4, the licensor terminal 3, and the administrator terminal 2 corresponding to the externally owned account EOA being a turning point. Note that the first public key in the present embodiment is preferably associated with the non-fungible token NFT as an owner identifier of the non-fungible token NFT.

The transfer unit 13 executes transaction processing of changing the owner identifier of the non-fungible token NFT into a first public key of a transfer destination via the externally owned account EOA on the basis of the first private key in the blockchain BCN. Note that after the first public key is updated, the management unit 12 executes the smart contract and updates the second public key of the non-fungible token NFT.

Figure 3:
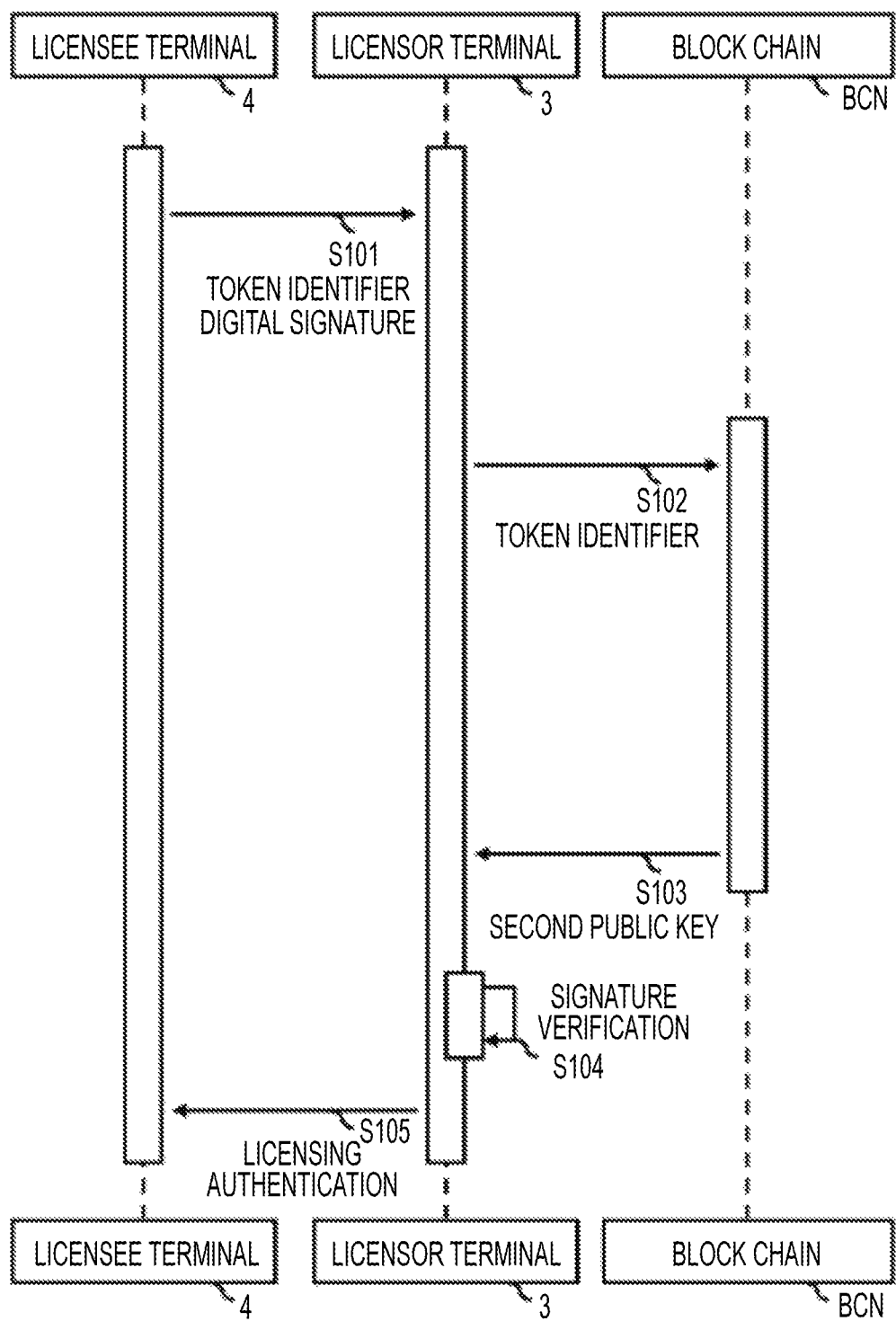
FIG. 3 is a sequence diagram according to the embodiment of the present invention.

With reception processing of a token identifier TID and a digital signature SGN corresponding to a non-fungible token NFT by the licensee terminal 4 that owns the non-fungible token NFT (step S101 in FIG. 3) as a turning point, the permission unit 31 executes input processing of the token identifier TID with respect to the blockchain BCN (step S102 in FIG. 3). The digital signature SGN is generated with a second private key. Also, the input processing is executed via Web3API.

The digital signature SGN in the present embodiment may be generated on the basis of device information corresponding to the licensee terminal 4 and/or biological information corresponding to an owner of the licensee terminal 4 in addition to the first private key. Here, in step S101, information transmitted by the licensee terminal 4 is arbitrarily determined on the basis of a kind of information included in the digital signature SGN.

The management unit 12 executes output processing of the second public key corresponding to the non-fungible token NFT with input processing of the token identifier TID by the licensor terminal 3 as a turning point (step S103 in FIG. 3). Here, output processing of the second public key is preferably performed. The output processing may be performed in a form of block reference of the blockchain BCN, or may be performed in a form of smart contract execution.

The permission unit 31 executes verification processing of the digital signature SGN on the basis of the second public key with the output processing of the second public key as a turning point (step S104 in FIG. 3), and executes licensing processing in a case where the verification processing is successful (step S105 in FIG. 3).

In the verification processing of the digital signature SGN in step S104, validity is confirmed on the basis of the second public key on which the output processing is performed and the digital signature SGN. The licensing processing includes activation of digital contents including software. The activation indicates cancellation of usage restriction of the digital contents, for example.

The management unit 12 updates a storage of the virtual auxiliary storage device EVM 103 and cancels association with a product identifier PID with respect to a non-fungible token NFT corresponding to a second private key with transaction processing based on the second private key by the licensee terminal 4 corresponding to the externally owned account as a turning point. In a case where the association is cancelled, the output processing of the second public key is not performed even when input processing of the token identifier TID by the permission unit 31 is performed.

In the present embodiment, the first public key and the first private key are associated for encryption/decryption, and the second public key and the second private key are also associated similarly.

According to an embodiment of the present invention, in an exchange including decentralized exchanges (DEX), distribution of a non-fungible token corresponding to ownership of digital contents including software is realized in a user-driven manner.

According to an embodiment of the present invention, in management of a token as a virtual currency/cryptocurrency, token management in which licensing processing can be executed even in a case of a loss of a first private key, the loss being considered as a problem, can be realized.

According to an embodiment of the present invention, a token management system that secures liquidity, that has a liberalized distribution price, and that is in a viewpoint of privacy protection of a purchaser and a seller is realized.

What is claimed is:

1. A token management system comprising: an administrator terminal includes a processor and a memory performs:
   generating a non-fungible token associated with a product identifier in a distributed ledger, associating the non-fungible token with a first public key as an owner identifier, and a second public key for licensing processing, in the distributed ledger, and transaction processing in the distributed ledger of changing a first public key as an owner identifier of a transfer source, which identifier is associated with the non-fungible token, into a first public key as an owner identifier of a transfer destination on a basis of a first private key of the transfer source; a licensee terminal includes a processor performs transaction processing in the distributed ledger of changing the first public key as the owner identifier of the transfer source, which identifier is associated with the non-fungible token, into the first public key as the owner identifier of the transfer destination on the basis of the first private key of the transfer source; and wherein the processor and the memory included by the administrator terminal registers the second public key as metadata of the non-fungible token on a basis of a data description language representing at least one of a numerical value, a character string, a truth value, an array, and an object.

2. The token management system according to claim 1, wherein the distributed ledger is a blockchain based on one or more nodes and a proof-of-work and/or proof-of-stake consensus algorithm, and has a virtual machine including a storage area.

3. The token management system according to claim 1, wherein the processor included by the administrator terminal associates the non-fungible token with the second public key of the transfer destination with the transaction processing by the administrator terminal as a turning point.

4. The token management system according to claim 1, wherein the processor included by the administrator terminal cancels association between the non-fungible token corresponding to the second public key and the product identifier with transaction processing based on a second private key as a turning point.

5. The token management system according to claim 1, further comprising
    a licensor terminal includes a processor performs, on a basis of the second public key, verification processing of a digital signature generated on a basis of the second private key and that performs licensing processing corresponding to the product identifier on a basis of a result of the verification processing.

6. A token management method comprising a processor and a memory: causing the processor of an administrator terminal to execute generating a non-fungible token associated with a product identifier in a distributed ledger, associating the non-fungible token with a first public key as an owner identifier, and a second public key for licensing processing, in the distributed ledger, and transaction processing in the distributed ledger of changing a first public key as an owner identifier of a transfer source, which identifier is associated with the non-fungible token, into a first public key as an owner identifier of a transfer destination on a basis of a first private key of the transfer source; causing a processor of a licensee terminal to execute transaction processing in the distributed ledger of changing the first public key as the owner identifier of the transfer source, which identifier is associated with the non-fungible token, into the first public key as the owner identifier of the transfer destination on the basis of the first private key of the transfer source; and wherein the processor and the memory included by the administrator terminal registers the second public key as metadata of the non-fungible token on a basis of a data description language representing at least one of a numerical value, a character string, a truth value, an array, and an object.

\* \* \* \* \*